(12) United States Patent
Nambu

(10) Patent No.: US 7,969,584 B2
(45) Date of Patent: Jun. 28, 2011

(54) MEASURING METHOD INCLUDING MEASURING ANGLE OF CONCAVE PORTION AND IRRADIATING LIGHT OVER CONCAVE PORTION

(75) Inventor: Hidetaka Nambu, Kanagawa (JP)

(73) Assignee: Renesas Electronic Corporation, Kawasaki-shi, Kanagawa (JP)

( * ) Notice: Subject to any disclaimer, the term of this patent is extended or adjusted under 35 U.S.C. 154(b) by 319 days.

(21) Appl. No.: 12/314,584

(22) Filed: Dec. 12, 2008

(65) Prior Publication Data

US 2009/0168069 A1 Jul. 2, 2009

(30) Foreign Application Priority Data

Dec. 28, 2007 (JP) ................. 2007-339158

(51) Int. Cl.
   *G01B 11/14* (2006.01)
(52) U.S. Cl. ..................................... 356/625
(58) Field of Classification Search ........... 356/625–640
   See application file for complete search history.

(56) References Cited

U.S. PATENT DOCUMENTS

| | | | |
|---|---|---|---|
| 6,483,580 B1 | 11/2002 | Xu et al. | |
| 6,785,009 B1 * | 8/2004 | Stirton et al. | 356/625 |
| 6,986,280 B2 * | 1/2006 | Muckenhirm | 73/104 |
| 2002/0033945 A1 | 3/2002 | Xu et al. | |
| 2003/0058443 A1 | 3/2003 | Xu et al. | |
| 2003/0133104 A1 * | 7/2003 | Niu et al. | 356/237.5 |
| 2004/0070772 A1 | 4/2004 | Shchegrov et al. | |

FOREIGN PATENT DOCUMENTS

| | | |
|---|---|---|
| JP | 2002-506198 | 2/2002 |
| JP | 2004-510152 | 4/2004 |
| JP | 2006-512561 | 4/2006 |

* cited by examiner

*Primary Examiner* — Michael P Stafira
*Assistant Examiner* — Tara S Pajoohi
(74) *Attorney, Agent, or Firm* — McGinn IP Law Group, PLLC

(57) ABSTRACT

The measuring method for providing a precise determination of a geometry of a concave portion is provided. The measuring method includes: measuring an angle of a side wall of a concave portion with a bottom surface thereof formed in an insulating film (operation S1); defining a plurality of parameter groups including an angle of the side wall of the concave portion with the bottom surface, a dimensional width and a dimensional depth and preparing library containing a plurality of waveforms of reflected lights respectively correlated with such plurality of parameter groups (operation S2); an operation of irradiating light over the concave portion (operation S4); an operation of detecting reflected light (operation S5); referencing the waveform of reflected light with the waveform selected from the library (operation S6); and when a difference between the waveform of reflected light and the waveform selected from the library is lower than a specified value, then assigning the parameter such as the dimensional width of the concave portion and the like correlated with the selected waveform for an optimum value to determine the geometry of the concave portion. The angle of the side wall of the concave portion with the bottom surface thereof in the parameter groups of the library is a measured angle in the operation S1.

5 Claims, 13 Drawing Sheets

FIRST LIBRARY 231

| | θ | H | MCD | THICKNESS |
|---|---|---|---|---|
| FIRST PARAMETER GROUP A1 | 95° | 125 | 140 | 410 |
| FIRST PARAMETER GROUP A2 | 95° | 130 | 150 | 410 |
| ⋮ | | | | |
| FIRST PARAMETER GROUP An | 95° | 200 | 200 | 410 |

SECOND LIBRARY 232

| | θ | H | SWA | THICKNESS |
|---|---|---|---|---|
| SECOND PARAMETER GROUP B1 | 95° | 125 | 140 | 370 |
| SECOND PARAMETER GROUP B2 | 95° | 130 | 150 | 370 |
| ⋮ | | | | |
| SECOND PARAMETER GROUP Bn | 95° | 200 | 200 | 370 |

THIRD LIBRARY 233

| | θ | H | MCD | THICKNESS |
|---|---|---|---|---|
| THIRD PARAMETER GROUP C1 | 95° | 125 | 140 | 450 |
| THIRD PARAMETER GROUP C2 | 95° | 130 | 150 | 450 |
| ⋮ | | | | |
| THIRD PARAMETER GROUP Cn | 95° | 200 | 200 | 450 |

FIG. 12

| SCATTEROMETRY (nm) | CRITICAL DIMENSION SEM (nm) | DIMENSIONAL DIFFERENCE (nm) |
|---|---|---|
| 78.2 | 110.7 | 32.5 |
| 84.8 | 114.8 | 30.0 |
| 85.2 | 115.3 | 30.1 |
| 89.5 | 117.1 | 27.6 |
| 91.8 | 118.0 | 26.2 |

FIG. 13 A
|  | SCATTEROMETRY (OCD) (nm) | CRITICAL DIMENSION SEM (nm) |
|---|---|---|
| Size (Average) (nm) | 115.8 | 115.8 |
| 3σ (nm) | 5.2 | 3.2 |
FIG. 13B
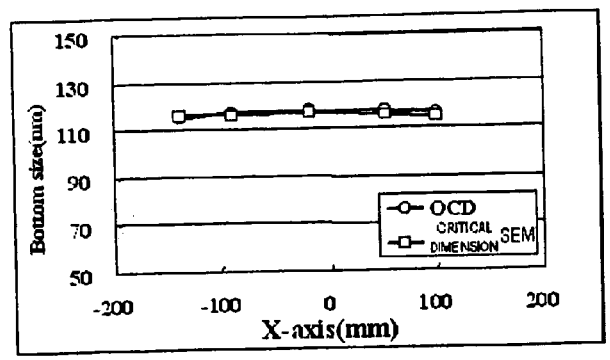
FIG. 13C
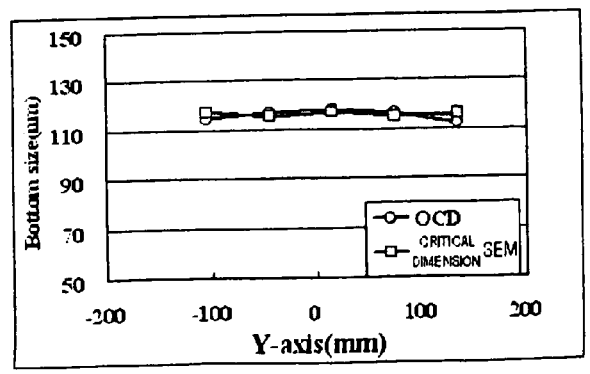

US 7,969,584 B2

MEASURING METHOD INCLUDING MEASURING ANGLE OF CONCAVE PORTION AND IRRADIATING LIGHT OVER CONCAVE PORTION

This application is based on Japanese patent application No. 2007-339,158, the content of which is incorporated hereinto by reference.

BACKGROUND

1. Technical Field

The present invention relates to a measuring method for determining a geometry of a concave portion.

2. Related Art

A conventional process for manufacturing of a semiconductor device employs a procedure, in which an interconnect trench and a via hole are formed in an insulating film, and a metallic layer is buried within the formed interconnect trench and the via hole to create an interconnect and a via. Geometries of the interconnect trenches and the via holes (hereinafter referred to as "interconnect trench and the like") are controlled by suitably adjusting the etching time in the conventional process.

However, a problem of difficulty in precisely determining the geometries of the interconnect trench and the like is caused in the manner for controlling the geometry by adjusting the etching time.

To solve the problem, a manner for determining the geometry of the interconnect trench and the like by irradiating light over the interconnect trench and the like and analyzing light reflected from the interconnect trench and the like (for example, a scatterometry (optical critical dimension (OCD) measurement)) is proposed (see Japanese Patent Domestic Publication for PCT Application No. 2004-510,152, Japanese Patent Domestic Publication for PCT Application No. 2002-506,198 and Japanese Patent Domestic Publication for PCT Application No. 2006-512,561).

In such manner, parameters for determining the geometry of the interconnect trench and the like (for example, depth of the interconnect trench and the like, angle of the side wall with the bottom surface of the interconnect trench and the like, dimensional width in the intermediate-deep position of the interconnect trench and the like) are previously correlated with waveform of the reflected light, and the correlated parameters are stored in a database (library). Then, the interconnect trench and the like is irradiated with light and the reflected light is detected with a detector to acquire waveform of the reflected light. Then, the acquired waveform of the reflected light is referenced with waveforms stored in the database. If the acquired waveform of the reflected light is identical to a waveform stored in the database, then the geometry of the interconnect trench and the like is defined as the parameter for determining the geometry of the interconnect trench and the like correlated with the waveform in the database. Here, when the database is prepared, the parameters for determining the geometry of the interconnect trench and the like (for example, depth of the interconnect trench and the like, angle of the side wall with the bottom surface of the interconnect trench and the like, dimensional width in the intermediate-deep position of the interconnect trench and the like) are utilized in a predetermined function to obtain a calculated waveform. In such configuration, the respective parameters are set to be variable so as to be adapted to various types of geometries of interconnect trenched and the like.

In the above-described measuring method, the measurement result obtained by a scatterometry may be significantly different from an actually measured value by an observation with a scanning electron microscope (SEM).

SUMMARY

According to results of the researches of the present inventors, the following factors have been found for causing the significant difference between the measurement result obtained by the scatterometry and the actually measured value by the observation with SEM. First of all, via holes having different dimensional widths of bottoms were formed, and the measurements were conducted by a scatterometry and by a critical dimension SEM (CD-SEM) to obtain a correlative relationship between two measuring manner. The results are shown in FIGS. 7A to 7C. Here, in FIGS. 7A to 7C, abscissa represents the dimensional width of the bottom by observation with a SEM, and ordinate represents the measured dimensional width of the bottom by a scatterometry.

FIG. 7B shows the results obtained under the condition that three parameters, namely the depth of the via hole, the angle of the side wall of the via hole with the bottom surface and the dimensional width in the intermediate-deep position of the via hole, were set to be variable in the preparation of the database by a scatterometry. In such case, an average of the measured dimensional widths of the bottoms of the via holes by the scatterometry significantly differed from an average of the actual dimensional widths of the bottom of the via hole by observations with the SEM, and the obtained correlation coefficient was as lower as 0.861. In addition to above, the dimensional width of the bottom of the via hole is a value calculated by utilizing three parameters, namely the depth of the via hole, the angle of the side wall of the via hole with the bottom surface and the dimensional width in the intermediate-deep position of the via hole.

FIG. 7C shows the results obtained under the condition that the dimensional width in the intermediate-deep position of the via hole was fixed to a predetermined value and the rest of the above-described three parameters were set to be variable in the preparation of the database by a scatterometry. In such case, an average of the measured dimensional widths of the bottoms of the via holes by the scatterometry also significantly differed from an average of the actual dimensional widths of the bottom of the via hole by observations with the SEM, and the obtained correlation coefficient was lower.

FIG. 7A shows the results obtained under the condition that the angle of the side wall of the via hole with the bottom surface was fixed to a predetermined value and the rest of the above-described three parameters were set to be variable in the preparation of the database by a scatterometry. In such case, an average of the measured dimensional widths of the bottoms of the via holes by the scatterometry was substantially equivalent to an average of the actual dimensional widths of the bottom of the via hole by observations with the SEM, and the obtained correlation coefficient was as much higher as 0.992.

According to the above-described investigation results, it is considered that a precise geometry can be determined by a scatterometry, by preparing a data library under the condition that the angle of the side wall of the interconnect trench and the like with the bottom surface is fixed to a predetermined value.

According to one aspect of the present invention, there is provided a measuring method, comprising: measuring an angle of a side wall of a concave portion formed in an insulating film with a bottom surface thereof; defining a plurality of parameter groups including an angle of a side wall of a concave portion formed in the insulating film with a bottom surface thereof, a dimensional width in a predetermined depth position of the concave portion, and a dimensional depth of the concave portion, and preparing a library storing a plurality of waveforms of reflected lights respectively correlated with the plurality of parameter groups; irradiating light over a concave portion formed in the insulating film; detecting reflected light from the concave portion irradiated with light; referencing the detected waveform of reflected light with the stored waveform selected from the library; if a difference between the detected waveform of reflected light and the stored waveform selected from the library is equal to or larger than a specified value, then referencing the detected waveform of reflected light with the stored waveform selected from the library again, and if the difference between the detected waveform of reflected light and the stored waveform selected from the library is lower than the specified value, then assigning the parameter group correlated with the waveform selected from the library for values indicating the geometry of the concave portion irradiated with light, the assigned parameter group including the dimensional width of the concave portion, the dimensional depth of the concave portion and the angle of the side wall of the concave portion with the bottom surface thereof; and determining the geometry of the concave portion from the value indicating the geometry of the concave portion, wherein, in the plurality of parameter groups in the defining plurality of parameter groups, the angles of the side wall of the concave portion with the bottom surface thereof are the same in the parameter groups, and at least any one of the other parameters including the dimensional width of the concave portion and the dimensional depth of the concave portion are different by the parameter groups, and wherein the angle of the side wall of the concave portion with the bottom surface thereof is a measured value obtained in the measuring the angle of the side wall of the concave portion with the bottom surface thereof.

Here, the concave portion for determining the geometry by being irradiated with light may be different from the concave portion that is employed for measuring the angle of the side wall with the bottom surface, and may be a concave portion, which is considered as having an angle of a side wall with substantially the same bottom surface as that of the concave portion for measuring the aforementioned angle. For example, the concave portion for determining the geometry by being irradiated with light may be formed under an etching condition, which is identical with an etching condition for forming the concave portion for measuring the angle.

According to the present invention, each of the plurality of parameter groups for preparing the library contains the same angle of the side wall of the concave portion with the bottom surface thereof, and at least any one of other parameters including the dimensional width of the concave portion and the dimensional depth of the concave portion is (are) different by the parameter groups. The angle of the side wall of the concave portion with the bottom surface thereof is the measured angle. As described above, the measured angle of the side wall of the concave portion with the bottom surface thereof is utilized as a fixed value to prepare the waveform, so that a precise geometry can be determined by a scatterometry. In addition to above, the waveform of reflected light indicates a wavelength-dependency of the intensity of reflected light, and the data of the intensity of reflected light may be measured by fixing an incident angle of light on the concave portion, or alternatively, the data of the intensity of reflected light may be incident angle-dependent data measured by changing (operating) the incident angle.

The difference between the detected waveform of reflected light and the stored waveform selected from the library may be for example a maximum difference between the detected waveform of reflected light and the stored waveform selected from the library, or alternatively, a difference between an integration value of the detected waveform of reflected light in a specific wavelength area and an integration value of the stored waveform selected from the library.

According to the present invention, a measuring method is provided, which achieves a precise determination of a geometry of a concave portion.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 12 includes a table, showing a difference of the dimensional width of the bottom in the concave portion determined by a scatterometry with the dimensional width of the bottom in the concave portion with a CD-SEM; and FIGS. 13A to 13C includes a table and two graphs, showing a difference of the dimensional width of the bottom in the concave portion determined by a scatterometry with the dimensional width of the bottom in the concave portion with a CD-SEM.

DETAILED DESCRIPTION OF THE PREFERRED EMBODIMENTS

Figure 1:
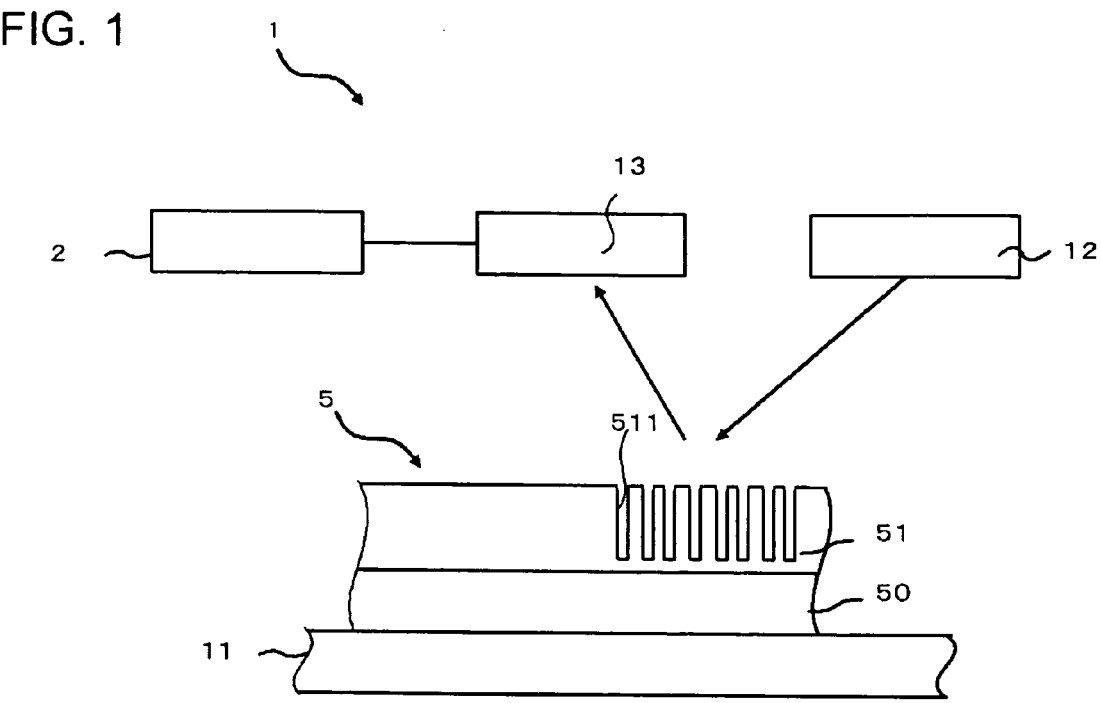
FIG. 1 is a schematic diagram, illustrating a measuring device according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Preferable embodiments of the present invention will be described as follows in reference to the annexed figures. In the beginning, an overview of the preferable configuration of the measuring method according to the present embodiment will be described in reference to FIG. 1 and FIG. 6. The measuring method of the present embodiment includes: an operation of measuring an angle of a side wall of a concave portion 511 formed by insulating film 51 with a bottom surface thereof (operation S1); an operation of defining a plurality of parameter groups A1 to An, B1 to Bn and C1 to Cn including an angle of the side wall of the concave portion 511 with the bottom surface, a dimensional width in a predetermined depth position of concave portion 511 and a dimensional depth of the concave portion 511 and preparing libraries 231, 232 and 233 containing a plurality of waveforms of reflected lights (wavelength-dependency of intensity of reflected light) respectively correlated with the parameter groups A1 to An, B1 to Bn and C1 to Cn (see FIG. 3 to FIG. 5) (operation S2); an operation of irradiating light over the concave portion 511 (operation S4); an operation of detecting reflected light from the concave portion 511 (operation S5); an operation of referencing the detected waveform of reflected light (wavelength-dependency of intensity of reflected light) with the waveform selected from the libraries 231, 232 and 233 (operation S6); an operation of referencing the detected waveform of reflected light with the waveform selected from the libraries 231, 232 and 233 again, if a difference between the detected waveform of reflected light and the waveform selected from the libraries 231, 232 and 233 is equal to or larger than a specified value (operation S7), and assigning the parameter group correlated with the waveform selected from the libraries 231, 232 and 233 for values indicating a geometry of the concave portion 511, if the difference between the detected waveform of reflected light and the waveform selected from the libraries 231, 232 and 233 is lower than the specified value (operation S7), the parameter group including the dimensional width of the concave portion 511, the dimensional depth of the concave portion 511 and the angle of the side wall of the concave portion 511 with the bottom surface thereof; and determining the geometry of the concave portion 511 from the value indicating the geometry of the concave portion 511. In the plurality of parameter groups A1 to An, B1 to Bn and C1 to Cn in the operation for defining the parameter groups and preparing the libraries 231, 232 and 233, the angles of the side wall of the concave portion 511 with the bottom surface thereof are the same in the parameter groups, and at least any one of other parameters including the dimensional width of the concave portion 511 and the dimensional depth of the concave portion 511 are different by the parameter groups, and the angle of the side wall of the concave portion 511 with the bottom surface thereof is a measured value.

Here, the waveform of reflected light indicates a wavelength-dependency of the intensity of reflected light, and the data of the intensity of reflected light may be measured by fixing an incident angle of light on the concave portion 511, or alternatively, the data of the intensity of reflected light may be incident angle-dependent data measured by changing (operating) the incident angle.

The difference between the detected waveform of reflected light and the stored waveform selected from the library may be for example a maximum difference between the detected waveform of reflected light and the stored waveform selected from the library, or alternatively, a difference between an integration value of the detected waveform of reflected light in a specific wavelength area and an integration value of the stored waveform selected from the library.

Next, details of the measuring method of the present embodiment will be described. In the beginning, a measuring device 1 employed in the measuring method of the present embodiment will be described. The measuring device 1 is provided to measure a geometry the concave portion 511 such as a trench such as an interconnect trench and the like or a pore such as a via hole and the like formed in an insulating film 51 in an upper portion of a substrate 50 (semiconductor substrate, for example) of a wafer 5. A plurality of regions for forming chips, though it is not shown, are provided in the wafer 5, and a plurality of concave portions 511 are formed in each of the regions for forming chips. Such concave portions 511 are formed by the same etching condition.

The measuring device 1 includes, as shown in FIG. 1, a stage 11 for disposing an object for measurement (wafer), a light source 12 for applying light over the object for measurement on the stage 11, an optical detector 13 for detecting reflected light from the object for measurement, and a calculator device 2 for calculating a geometry of the concave portion 511 with reflected light detected by the optical detector 13.

Figure 2:
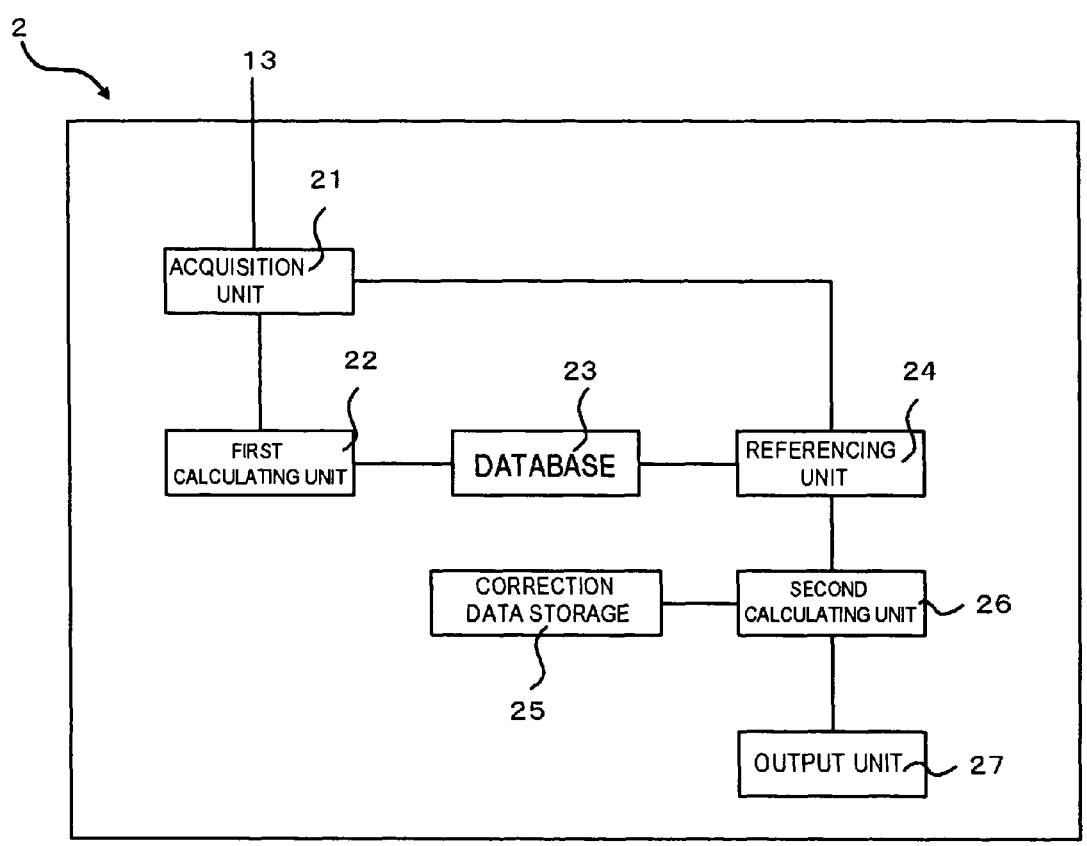
FIG. 2 is a block diagram, illustrating a calculator device of the measuring device.

The calculator device 2 is shown in FIG. 2. The calculator device 2 includes an acquisition unit 21, a first calculating unit 22, a database 23, a referencing unit 24, a correction data storage unit 25, a second calculating unit 26, and an output unit 27. The acquisition unit 21 is connected to the detector 13 to acquire the waveform of reflected light detected by the optical detector 13. The acquisition unit 21 also acquires data of parameters for indicating the geometry of the concave portion 511. When the first calculating unit 22 acquires a plurality of parameters (parameter groups) that indicate the geometry of the concave portion 511 with the acquisition unit 21, the first calculating unit 22 calculates the waveform of reflected light by such parameter group.

More specifically, for example, the parameter groups include parameters such as the angle of the side wall of the concave portion 511 with the bottom surface thereof (hereinafter occasionally indicated by "θ"), the dimensional width in a predetermined depth position (intermediate-deep position in the present embodiment) of the concave portion 511 (hereinafter occasionally indicated by "MCD"), the dimensional depth of the concave portion 511 (hereinafter occasionally indicated by "H"), the thickness of the insulating film 51 having the concave portion 511 formed therein and the like. The respective parameters in the parameters group are suitably utilized in a predetermined function to calculate the waveform of reflected light. The waveform of reflected light calculated in the first calculating unit 22 is correlated with the parameter group obtained by the acquisition unit 21 and employed for the calculation in the first calculating unit 22 and then such correlated waveform and the parameter group are stored in the database 23.

Figure 3:
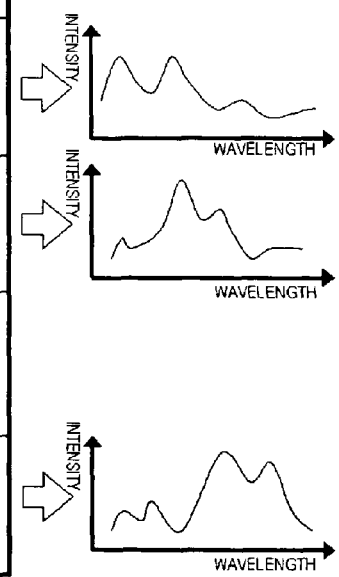
FIG. 3 is a diagram, schematically illustrating a structure of a library.
Figure 4:
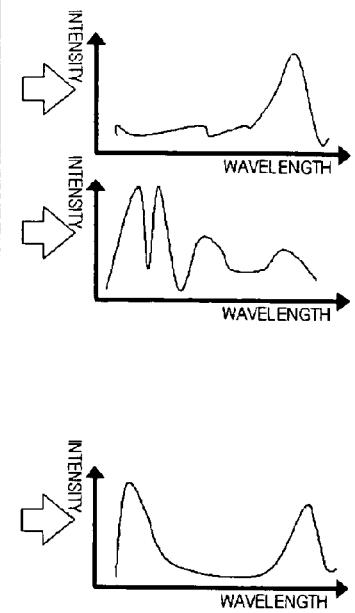
FIG. 4 is a diagram, schematically illustrating a structure of another library.
Figure 5:
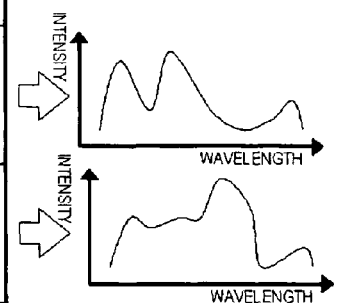
FIG. 5 is a diagram, schematically illustrating a structure of yet other library.
Figure 5:
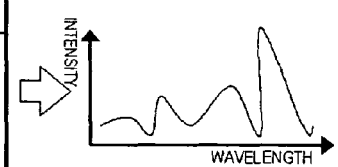

The libraries 231, 232 and 233 stored in the database 23 are shown in FIGS. 3 to 5. A plurality of libraries 231, 232 and 233 are stored in such database 23. The libraries 231, 232 and 233 contain the waveforms of plurality of reflected lights, which are correlated with a plurality of parameter groups, respectively.

More specifically, the first library 231 stores the first parameter group A1 to An, each of which includes the same angle of the side wall with the bottom surface of the concave portion 511 and the same thickness thereof. In each of the first parameter group A1 to An, the only angle of the side wall with the bottom surface of the concave portion 511 and the thickness thereof are the same, and at least one of the depth of the concave portion 511 and the dimensional width in a predetermined depth position of the concave portion 511 (intermediate-deep position in the present embodiment) is different by the groups. Then, the waveforms of a plurality of reflected lights correlated with the respective first parameter group A1 to An are stored.

As shown in FIG. 4, the angle of the side wall with the bottom surface of the concave portion 511 in the second library 232 is the same as that of the first library 231, and the second library 232 stores the second parameter group B1 to Bn having the thickness of the film, which is different from the thickness in the first library 231. The waveforms of a plurality of reflected lights correlated with the respective second parameter group B1 to Bn are stored in the second library 232. In the second parameter group B1 to Bn, the angle of the side wall with the bottom surface of the concave portion 511 and the thickness thereof are the same, and at least one of the depth of the concave portion 511 and the dimensional width of the concave portion 511 in a predetermined depth position (intermediate-deep position in the present embodiment) is different.

As shown in FIG. 5, in the third library 233, the angle of the side wall with the bottom surface of the concave portion 511 is the same as that of the first library 231, and the third library 233 stores the third parameter group C1 to Cn having the thickness that is different from the thickness in the first library 231. In the third parameter group C1 to Cn, the angle of the side wall with the bottom surface of the concave portion 511 and the thickness thereof are the same, and at least one of the depth of the concave portion 511 and the dimensional width of the concave portion 511 in a predetermined depth position (intermediate-deep position in the present embodiment) is different. The waveforms of a plurality of reflected lights correlated with the respective third parameter group C1 to Cn are stored in the third library 233.

The referencing unit 24 shown in FIG. 2 serves as referencing the waveform of reflected light acquired by the acquisition unit 21 with the waveforms stored in the database 23.

If a difference between the waveform of reflected light acquired by the acquisition unit 21 and the waveform selected from the libraries 231 to 233 in the database 23 is equal to or larger than a specified value, then another waveform is selected from the libraries 231 to 233 in the database 23 again, and the detected waveform of reflected light is referenced with the selected waveform. If a difference between the waveform of reflected light acquired by the acquisition unit 21 and the waveform selected from the libraries 231 to 233 is lower than the specified value, the parameter group of the concave portion 511 correlated with the waveform selected from the libraries 231 to 233 is detected as a value for indicating the geometry of the concave portion 511.

The second calculating unit 26 corrects the geometry of the concave portion 511 determined by the parameter group indicating the geometry of the concave portion 511 detected by the referencing unit 24. The correction of the geometry of the concave portion 511 is carried out on the basis of the correction data stored in the correction data storage 25. For example, in the present embodiment, the dimensional width of the bottom of the concave portion 511 may be determined from the parameter group indicating the geometry of the concave portion 511 detected by the referencing unit 24. The dimensional width of the bottom is corrected in the second calculating unit 26. Then, the corrected data is output as the geometry of the concave portion 511.

Figure 6:
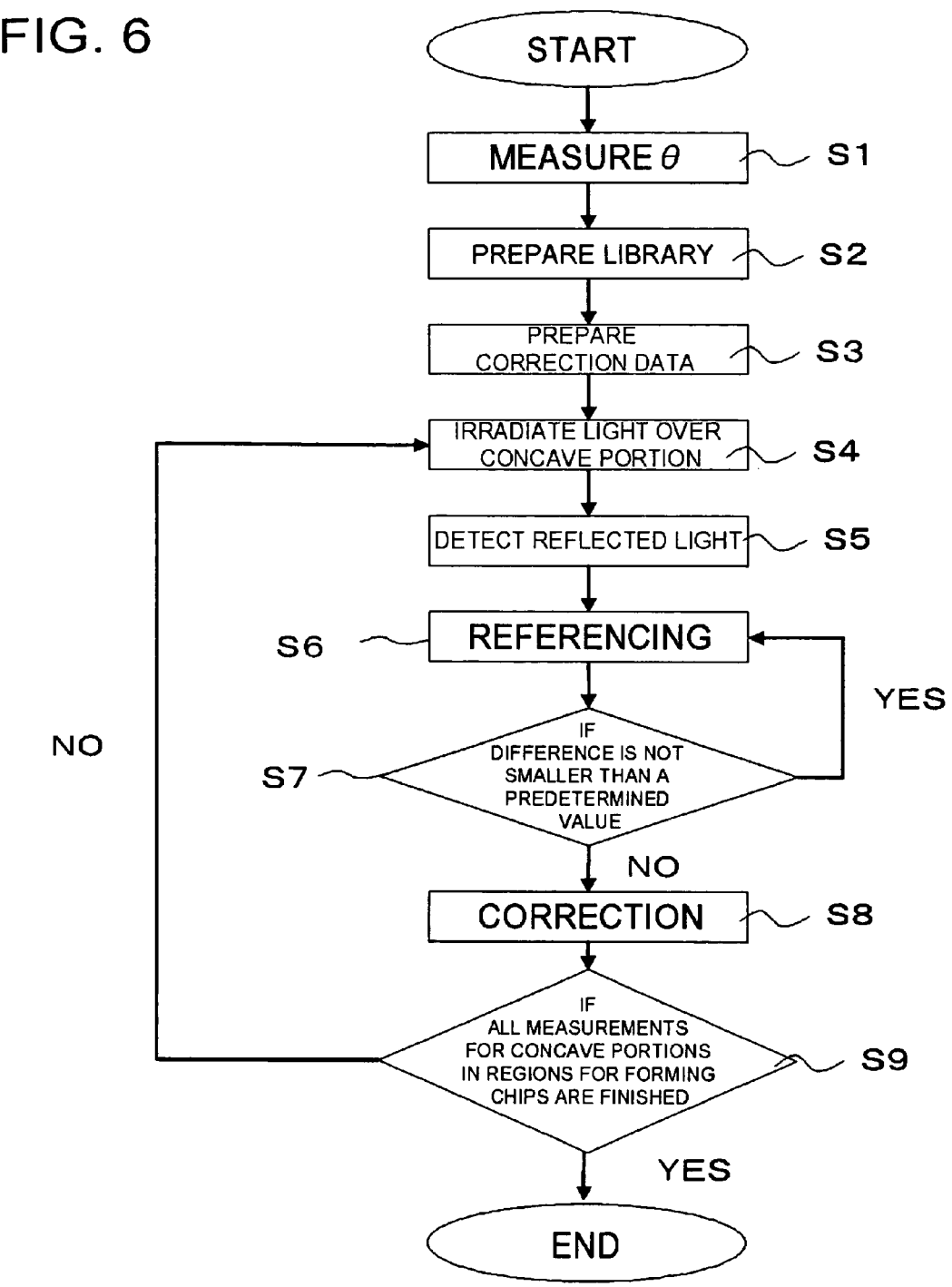
FIG. 6 is a flow chart, showing a scheme of the measuring method.

Next, the measuring method employing the above-described measuring device 1 will be described in reference to FIG. 6.

In the beginning of the preparation of the libraries 231 to 233, an angle of the side wall with the bottom surface of the concave portion 511 in the insulating film 51 of the wafer 5 is measured. Here, a CD-SEM is employed to conduct the measurement (operation S1). The concave portion 511 to be measured is preferable to be the concave portion 511 formed in the region for forming chip in the center of the wafer 5. More specifically, a value of the dimensional depth of the concave portion 511 is expected by an etch rate and an etching time for the concave portion 511. Next, the CD-SEM is employed to actually measure the dimensional width of the bottom of the concave portion 511 and the dimensional width of an opening of the concave portion 511 (upper end side of concave portion 511).

Then, the angle of the side wall with the bottom surface of the concave portion 511 is calculated by utilizing the dimensional width of the bottom of the concave portion 511, the dimensional width of the opening of the concave portion 511 and the dimensional depth of the concave portion 511.

Next, the library is prepared (operation S2). An operator establishes the first parameter groups A1 to An containing the angles of the side wall with the bottom surface of the concave portion 511, the dimensional widths in the predetermined depth position of the concave portion 511, the dimensional depths of the concave portion 511, and the thickness of the insulating film 51. Here, the angle of the side wall with the bottom surface of the concave portion 511 is a measured value measured in the operation S1. Then, the first parameter group A1 to An input to the calculator device 2 is acquired by the acquisition unit 21. Further, the first calculating unit 22 utilizes the respective first parameter group A1 to An acquired by the acquisition unit 21 for a predetermined function to calculate a plurality of waveforms of reflected lights respectively correlated with first parameter group A1 to An. The first parameter group A1 to An and the plurality of waveforms correlated therewith are stored in the database 23 as the first library 231.

Similarly, the second parameter group B1 to Bn and the plurality of waveforms correlated therewith are stored in the database 23 as the second library 232. Similarly, the third parameter group C1 to Cn and the plurality of waveforms correlated therewith are stored in the database 23 as the third library 233.

Here, the reason for fixing the value of θ to the measured value in the respective libraries 231 to 233 will be described.

As described above, FIG. 7B shows the results obtained under the condition that three parameters, namely the depth of the via hole, the angle of the side wall of the via hole with the bottom surface and the dimensional width in the intermediate-deep position of the via hole, were set to be variable in the preparation of the database by a scatterometry. In such case, an average of the measured dimensional widths of the bottoms of the via holes by the scatterometry significantly differed from an average of the actual dimensional widths of the bottom of the via hole by observations with the SEM, and the obtained correlation coefficient was lower as 0.861.

Figure 7A:
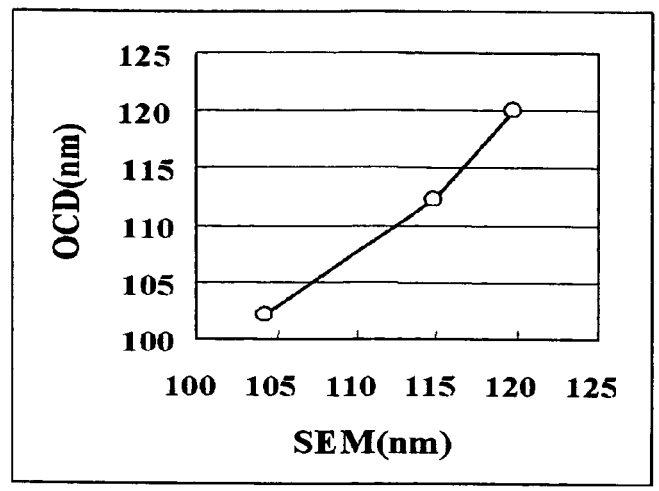
FIGS. 7A, 7B and 7C are graphs, showing correlations of measured values by a scatterometry and measured values by a CD-SEM.
Figure 7B:
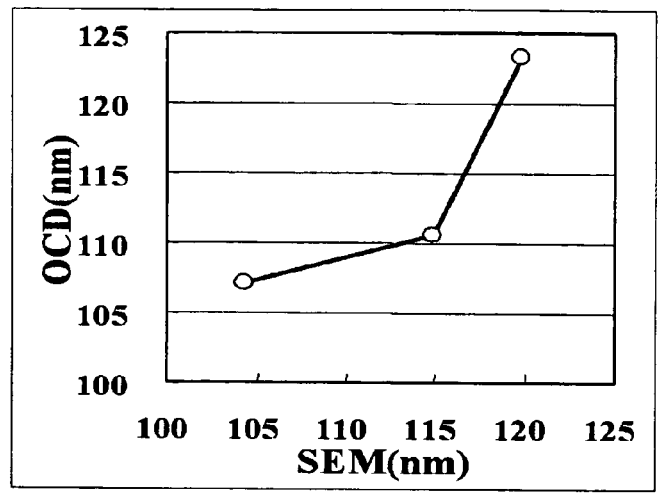
Figure 7C:
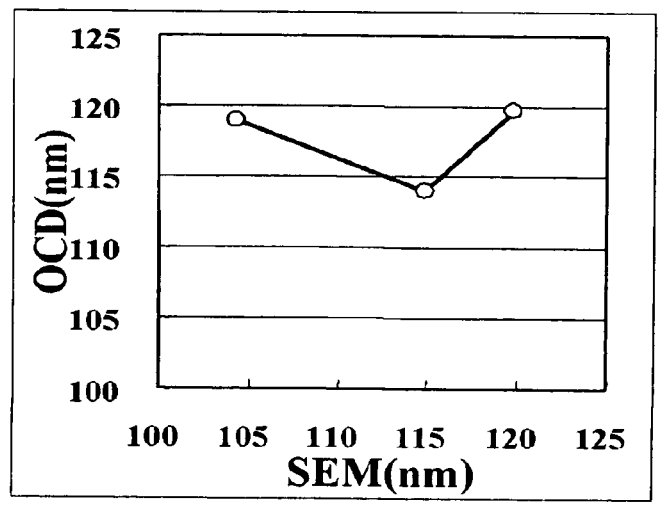

FIG. 7C shows the results obtained under the condition that the dimensional width in the intermediate-deep position of the via hole was fixed to a predetermined value and the rest of the above-described three parameters were set to be variable in the preparation of the database by a scatterometry. In such case, an average of the measured dimensional widths of the bottoms of the via holes by the scatterometry also significantly differed from an average of the actual dimensional widths of the bottom of the via hole by observations with the SEM, and the obtained correlation coefficient was lower.

On the other hand, FIG. 7A shows the results obtained under the condition that the angle of the side wall of the via hole with the bottom surface was fixed to a predetermined value and the rest of the above-described three parameters were set to be variable in the preparation of the database by a scatterometry. In such case, an average of the measured dimensional widths of the bottoms of the via holes by the scatterometry was substantially equivalent to an average of the actual dimensional widths of the bottom of the via hole by observations with the SEM, and the obtained correlation coefficient was much higher as 0.992. According to the above-described investigation results, it is considered that a precise geometry can be known by a scatterometry, by preparing a data library under the condition that the angle of the side wall of the concave portion with the bottom surface thereof is fixed to a predetermined value.

Figure 8A:
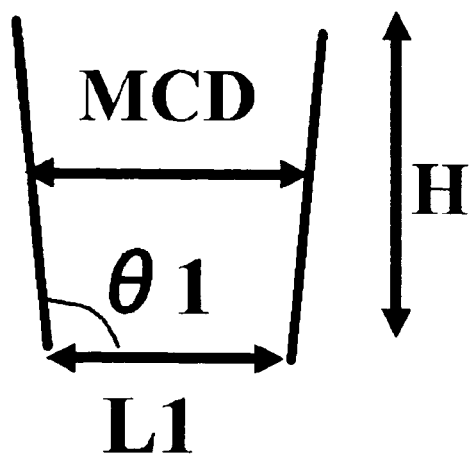
FIGS. 8A and 8B are diagrams, schematically illustrating an influence of the angle of the side wall of the concave portion with the bottom surface thereof over the geometry of the concave portion.
Figure 8B:
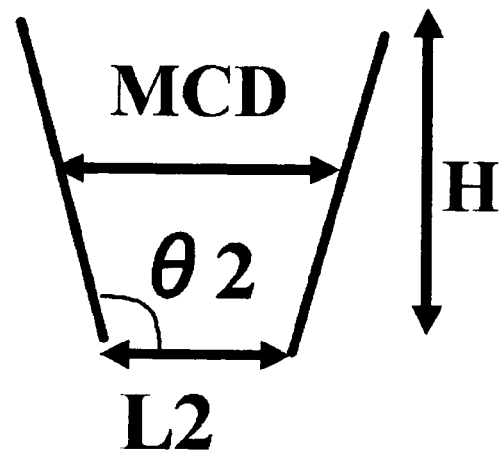
Figure 9A:
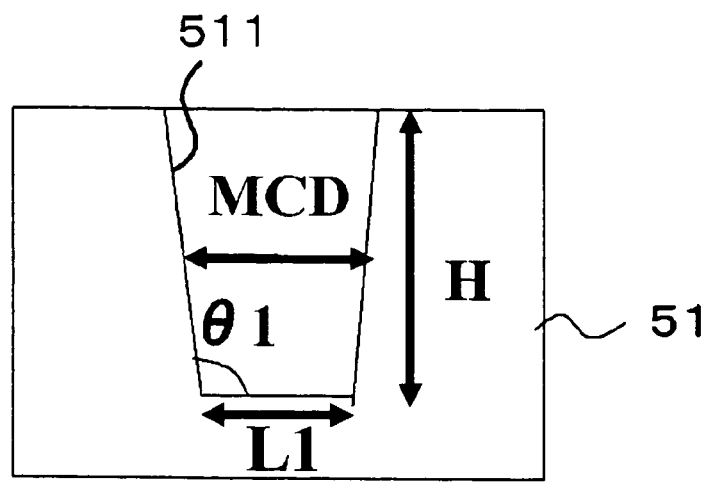
FIGS. 9A and 9B are diagrams, schematically illustrating an influence of the angle of the side wall of the concave portion with the bottom surface thereof over the geometry of the concave portion, in a case of cross-sectional rectangle geometry and a bowing geometry for the geometry of a concave portion, respectively.
Figure 9B:
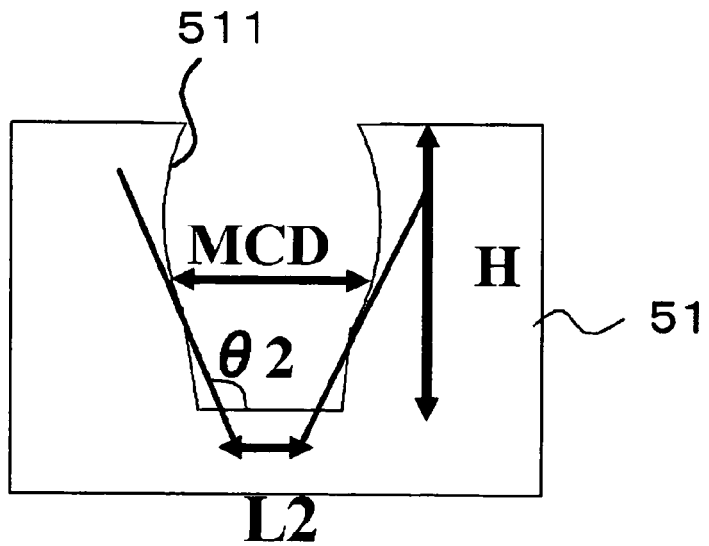

The following reasons may be expected for the reason for achieving the precise determination of the geometry by fixing the angle of the side wall of the concave portion with the bottom surface thereof to a predetermined value. As shown in FIGS. 8A and 8B, different value of $\theta$ causes a considerable changes of the dimensional widths L1 and L2 of the bottom of the concave portion, even if the MCD and the H are the same value. The etching process for the insulating film 51 of the wafer 5 may cause, in the surface of the same wafer, a rectangular cross-sectional geometry of the concave portion 511 as shown in FIG. 9A or a bowing geometry of the concave portion 511 as shown in FIG. 9B. When $\theta$ is presented as being variable in such case, an waveform calculated by utilizing a parameter of an angle $\theta 2$ obtained by employing the geometry of the bent portion of the bowing geometry as a reference geometry may coincide with the waveform of reflected light. Such $\theta 2$ is an angle that is different from the actual angle $\theta 1$ of the side wall with the bottom. Therefore, the obtained dimensional width of the bottom in the case of the bowing geometry may be considerably different from the actually measured dimensional width. This causes considerable variation in the dimensional width of the bottom of the concave portion 511 in the same wafer surface, causing a larger difference between the average of the dimensional widths of the bottom in the concave portion 511 by a scatterometry and the average value of the dimensional width of the bottom in the concave portion 511 by an observation with a SEM.

Figure 10A:
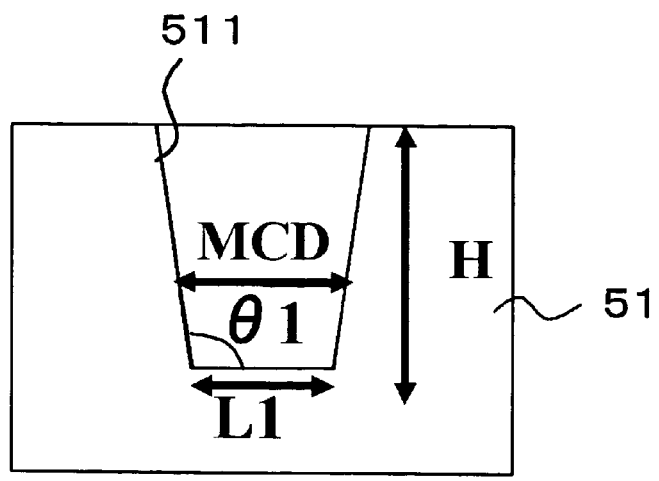
FIGS. 10A and 10B are diagrams, schematically illustrating an influence of the angle of the side wall of the concave portion with the bottom surface thereof over the geometry of the concave portion, in a case of cross-sectional rectangle geometry and a bowing geometry for the geometry of a concave portion, respectively.
Figure 10B:
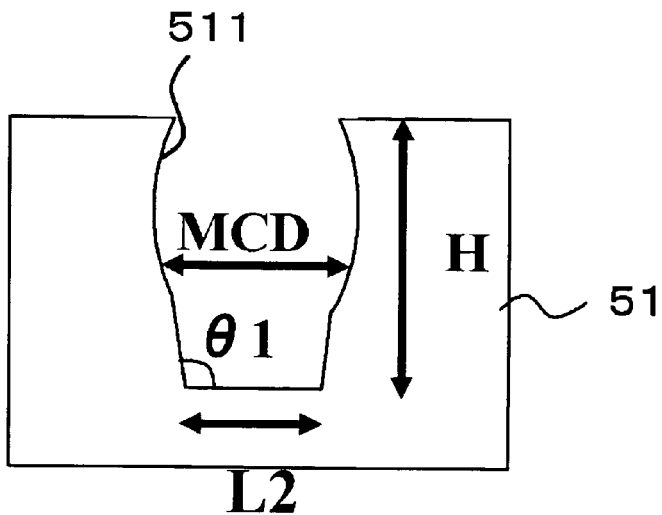

On the contrary, as shown in FIGS. 10A and 10B, the value of $\theta$ is fixed to a constant $\theta 1$ (actually measured value) and the same angle as that of cross-sectional rectangular geometry is employed for the bowing geometry, so that a creation of a larger difference between the average of the dimensional widths of the bottom in the concave portion 511 by a scatterometry and the average value of the dimensional width of the bottom in the concave portion 511 by an observation with a SEM is inhibited.

Figure 11:
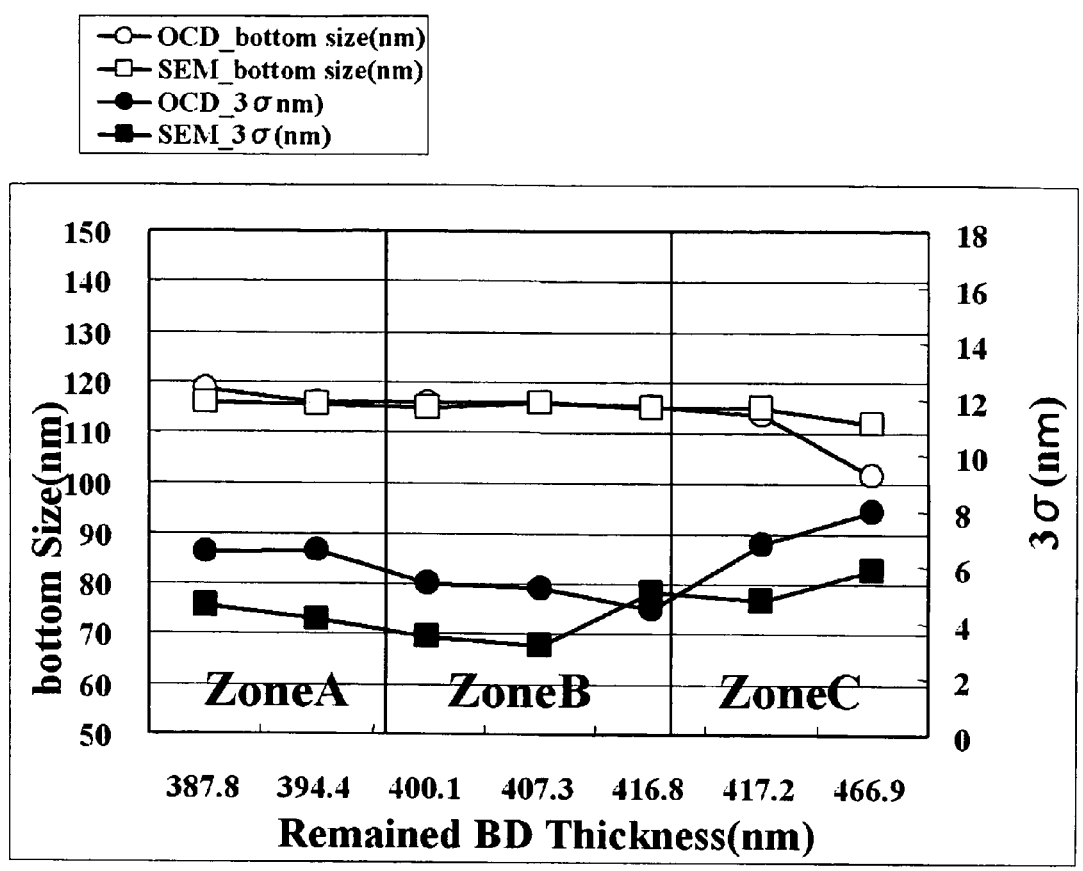
FIG. 11 is a graph, showing values of dimensional widths of bottoms in concave portions, which are measured by a scatterometry in a condition of employing a constant film thickness of 400 nm, and actually measured values of dimensional widths of bottoms in concave portions measured by an observation with SEM.

In addition, the reason for having different value of the thickness in each of the libraries 231 to 233 is as follows. FIG. 11 shows comparisons of the dimensional widths of the bottom of the concave portion 511 measured by a scatterometry by fixing the thickness to 400 nm and the actual dimensional widths of the bottom of the concave portion 511 by an observation with a SEM.

Abscissa in FIG. 11 represents the thickness of the insulating film. In FIG. 11, data indicated by "OCD" are data measured by the scatterometry. According to FIG. 11, it is understood that the difference is increased when the thickness is beyond a certain range (zone B) (i.e., in zone A or zone C).

This indicates that the actual thickness is influential on the geometry of the concave portion 511, and also indicates that, when the value of the thickness is fixed, the precise measurement can only be carried out within a certain range. Therefore, a precise determination of the geometry of the concave portion 511 can be achieved by conducting the referencing of the waveform under the condition that the different thickness is presented in each of the libraries 231 to 233 and the library having the thickness value that is closer to the thickness of the real insulating film are selected among the libraries 231 to 233. In the process for manufacturing wafers, the thickness of insulating film 51 is not necessarily constant, and some variation is caused. Therefore, when the concave portions 511 formed in the insulating films 51, which are manufactured in the same process conditions, are to be measured, it is critical to determine the thickness of the insulating film 51 and to suitably select the associated library, for the purpose of precisely measuring the geometry of the concave portion 511.

Next, correction data for being stored in the correction data storage 25 is prepared (operation S3). It is found that, although the difference between the measured value by the scatterometry and the actual value by the observation with the SEM is improved as compared with the conventional configuration when the value of $\Lambda$ is fixed to a constant value in each of the libraries 231 to 233, a slight difference between is still caused between the measured value by the scatterometry and the actual value by the observation with the SEM. It is also found that a constant difference level is still caused between the dimensional width of the bottom in the concave portion 511 determined by the scatterometry and the actual value of the dimensional width of the bottom in the concave portion 511 by the CD-SEM, when the value of $\theta$ is fixed to a constant value in each of the libraries 231 to 233 to conduct the measurements as shown in FIG. 12. It is further found that the level of such difference is not dependent upon the dimensional width of the bottom in the concave portion 511, and falls into a substantially constant value if the etching condition for the concave portion 511 is the same. Then, the levels of such difference are averaged to be stored as correction data (for example, 29.28 nm in the present embodiment) in the correction data storage 25. FIGS. 13A to 13C show the differences between the dimensional width of the bottom in the concave portion that reflects the correction data and the dimensional width of the bottom in the concave portion by the CD-SEM. FIG. 13B shows the dimensional width of the bottom in the concave portion in the predetermined position along a direction of x-axis in the wafer surface, and FIG. 13C shows the dimensional width of the bottom in the concave portion in the predetermined position along a direction of y-axis in the wafer surface. It is understood from the results that substantially no difference lies between the dimensional width of the bottom in the concave portion 511 that reflects the correction data and the dimensional width of the bottom in the concave portion 511 by the CD-SEM.

Next, the measurement is started. The concave portion 511 in the wafer is irradiated with light from the light source 12 (operation S4), and the reflected light is detected with the detector 13 (operation S5). Here, the concave portion 511 to be measured may be the same concave portion 511 that has been employed for measuring $\theta$, or may alternatively be the other concave portion 511 formed in the insulating film 51. The waveform of the reflected light is sent through the acquisition unit 21 to the referencing unit 24. In such occasion, the thickness of the insulating film 51 of the wafer 5 to be measured is entered. The thickness of the insulating film 51 is also sent through the acquisition unit 21 to the referencing unit 24.

The referencing unit 24 references the acquired waveform of reflected light with the stored waveforms in the database (operation S6). In this time, the referencing unit 24 suitably selects the libraries 231 to 233 according to the acquired thickness of the insulating film 51. For example, if the first library 231 includes the thickness of 410 nm and the thickness of the insulating film of the wafer to be measured is within the range of 410+/−20 nm, then the first library 231 is selected.

If the second library 232 includes the thickness of 370 nm and the thickness of the insulating film of the wafer to be measured is within the range of 370+/−20 nm, then the second library 232 is selected. Further, if the third library 233 includes the thickness of 450 nm and the thickness of the insulating film of the wafer to be measured is within the range of 450+/−20 nm, then the third library 233 is selected. The referencing unit 24 carries out the referencing of the selected waveform with the waveform of reflected light, and if the difference level is equal to or higher than a specified value (operation S7), the selection of waveform is conducted again and then the referencing of the selected waveform with the waveform of reflected light is also conducted.

On the other hand, if the difference level is lower than the specified value (operation S7), the parameter group correlated with the selected waveform is assigned to the parameter indicating the geometry of the concave portion 511. Next, the second calculating unit 26 conducts a correction for the geometry of the concave portion 511 obtained by the parameter group obtained in the referencing unit 24 (operation S8). More specifically, a correction of the dimensional width of the bottom in the concave portion 511 calculated by the parameter group is conducted on the basis of the correction data stored in the correction data storage 25. In addition to above, the dimensional width of the bottom calculated by parameter group is a value calculated by utilizing MCD, H and θ of the concave portion 511. Then, the corrected geometry is output as the geometry of the concave portion 511, which is based on the determination of the corrected dimensional width of the bottom in the concave portion 511.

Next, if there is other concave portion 511 that is not the concave portion 511 for being measured (for example, a concave portion 511 that is in the region for forming chips, which is different from the region for forming chips of measured concave portion 511), then a measurement of such other concave portion 511 is conducted (operation S9). More specifically, the operations S4 to S8 are also conducted for such other concave portion 511. As described above, the measurement of the concave portions 511 of respective regions for forming chips in the wafer 5 is conducted. Further, concave portions of other wafer, which is not the wafer 5 but is manufactured by the same manufacturing process as employed for the wafer 5, and has concave portions formed by the same etching condition as employed for the concave portion 511 and also has substantially the similar layer-structure of the insulating film and the thickness of the insulating film, may be measured by employing the measuring device 1. In such case, the operations S4 to S9 may be conducted.

Next, advantageous effects obtainable by employing the configuration of the present embodiment will be described. In the plurality of parameter groups A1 to An, B1 to Bn and C1 to Cn for preparing the libraries 231, 232 and 233, the angles of the side wall of the concave portion 511 with the bottom surface thereof are the same in the parameter groups, and at least any one of other parameters including the dimensional width of the concave portion 511 and the dimensional depth of the concave portion 511 are different by the parameter groups. The angle of the side wall of the concave portion 511 with the bottom surface thereof is a measured value, which is measured by employing the CD-SEM. As described above, the measured angle of the side wall of the concave portion 511 with the bottom surface thereof is utilized as a fixed value to prepare the waveform, so that a precise geometry can be determined by a scatterometry.

Further, in the present embodiment, the angle of the side wall with the bottom surface of the concave portion 511 is measured by a CD-SEM. This allows actually measuring an angle of the side wall with the bottom surface of concave portion 511 without a need for destroying the wafer 5.

Then, the measured value obtained by the CD-SEM is employed for the preparation of the library, and the geometry of the concave portion 511 is determined by employing the wafer 5 measured by the CD-SEM. More specifically, the same wafer may be employed for the wafer 5 employed for preparing the library and the wafer 5 for determining the geometry of the concave portion 511. Therefore, more precise determination of the geometry of the concave portion 511 can be achieved, as compared with the case of the preparation of the library by actually measuring the geometry of the concave portion with a sample wafer and the like.

Further, since a difference between the geometry of the concave portion 511 determined with the obtained value by referencing the waveform of libraries 231, 232 and 233 with the waveform of reflected light (more specifically, dimensional width of the bottom of the concave portion 511) and the actual value of the geometry of the concave portion 511 by the CD-SEM is determined to achieve a correction of the geometry of the concave portion 511 in the present embodiment, more precise determination of the geometry of the concave portion 511 can be achieved.

When the a plurality of parameter groups including the fixed angle of the side wall with the bottom surface of the concave portion 511 is employed to conduct the measurement, the use of the fixed thickness of the insulating film in plurality of parameter groups to a predetermined value may possibly cause a difference between the geometry of the concave portion 511 obtained by the measurement and the geometry of the real concave portion 511. To solve the problem, a plurality of libraries 231, 232 and 233 are provided according to the thickness of the insulating film 51, and the suitable libraries 231, 232 and 233 according to the actual thickness of the insulating film 51 is selected to provide more precise measurement.

It is intended that the present invention is not particularly limited to the above-mentioned embodiment, and any modification or improvement within the range for achieving the purpose of the present invention is included in the scope of the present invention. For example, although θ, MCD and H are presented for the parameters constituting the parameter group in the aforementioned embodiment, the parameters constituting the parameter group may not particularly limited thereto. The depth dimension of the concave portion 511 may alternatively be presented, in addition to the parameters of θ, MCD and H.

For example, when a via hole is measured as a concave portion, it is preferable to adopt a depth dimension of the via hole for the parameter. Such manner allows more precise determination of the geometry of the concave portion.

Further, while constant thickness of the insulating film is adopted for each parameter group of the first parameter group A1 to An, the second parameter group B1 to Bn and the third parameter group C1 to Cn in the above-described embodiment, the present invention is not particularly limited thereto, and the thickness of the insulating film may be suitably defined, without fixing to a certain thickness.

In addition, while the CD-SEM is employed to measure the value of θ in the above-described embodiment, the present invention is not particularly limited thereto, and the value of θ may be measured by other method except the CD-SEM. For example, a sample wafer may be prepared, and a value of θ of a concave portion in the sample wafer may be actually measured by an observation employing a cross-sectional SEM. Then, a geometry of a concave portion 511 of a wafer, which is manufactured by a manufacturing process same as that for the sample wafer, may be measured.

It is apparent that the present invention is not limited to the above embodiment, and may be modified and changed without departing from the scope and spirit of the invention.

What is claimed is:

1. A measuring method, comprising:
measuring an angle of a side wall of a concave portion formed in an insulating film with a bottom surface thereof;
defining a plurality of parameter groups including an angle of a side wall of a concave portion formed in the insulating film with a bottom surface thereof, a dimensional width in a predetermined depth position of said concave portion, and a dimensional depth of said concave portion, and preparing a library storing a plurality of waveforms of reflected lights respectively correlated with said plurality of parameter groups;
irradiating light over a concave portion formed in the insulating film;
detecting reflected light from said concave portion irradiated with light;
referencing the detected waveform of reflected light with the stored waveform selected from said library;
if a difference between the detected waveform of reflected light and the stored waveform selected from said library is equal to or larger than a specified value, then referencing the detected waveform of reflected light with the stored waveform selected from said library again, and if the difference between the detected waveform of reflected light and the stored waveform selected from said library is lower than the specified value, then assigning said parameter group correlated with the waveform selected from said library for values indicating the geometry of said concave portion irradiated with light, said assigned parameter group including said dimensional width of the concave portion, said dimensional depth of the concave portion and said angle of the side wall of the concave portion with the bottom surface thereof; and
determining the geometry of said concave portion from said value indicating the geometry of said concave portion,
wherein, in said plurality of parameter groups in said defining plurality of parameter groups, the angles of the side wall of said concave portion with the bottom surface thereof are the same in the parameter groups, and at least any one of the other parameters including said dimensional width of the concave portion and said dimensional depth of the concave portion are different by the parameter groups, and
wherein the angle of the side wall of said concave portion with the bottom surface thereof is a measured value obtained in said measuring the angle of the side wall of the concave portion with the bottom surface thereof.

2. The measuring method as set forth in claim 1, said measuring the angle of the side wall of the concave portion formed in the insulating film with the bottom surface thereof includes acquiring a dimensional depth of said concave portion and measuring a dimensional width of the bottom of said concave portion and a dimensional width of an opening of said concave portion by utilizing a critical dimension scanning electron microscope (critical dimension SEM) to determine the angle of the side wall of said concave portion with the bottom surface thereof.

3. The measuring method as set forth in claim 2,
wherein a plurality of concave portions are formed in said insulating film having said concave portion formed therein that is measured by said critical dimension SEM,
wherein said irradiating light over the concave portion includes irradiating light over the other concave portion, which is not said concave portion that is measured by said critical dimension SEM, and
wherein said determining the geometry of said concave portion includes determining a geometry of said other concave portion.

4. The measuring method as set forth in claim 1,
wherein a difference between a derived geometry of said concave portion and a measured geometry of said concave portion is acquired in advance, said derived geometry being directly derived by said value indicating the geometry of said concave portion, and said measured geometry of said concave portion being measured by a manner that is different from the manner for directly deriving the geometry by said value indicating the geometry, and
wherein said determining the geometry of said concave portion includes correcting the geometry of said concave portion directly derived by said value indicating the geometry of said concave portion on the basis of said difference acquired in advance.

5. The measuring method as set forth in claim 1, wherein each of said parameter groups includes a thickness of said insulating film as a parameter,
wherein said defining a plurality of parameter groups includes defining a plurality of first parameter groups and preparing a first library, each of said first parameter groups including the same thickness of the insulating film, and said first library including a plurality of waveforms of reflected lights that are correlated with said plurality of first parameter groups, respectively,
wherein said defining a plurality of parameter groups also includes defining a plurality of second parameter groups and preparing a second library, each of said second parameter groups including the same thickness of the insulating film, which is different from said thickness of the insulating film in said first parameter groups, and said first library including a plurality of waveforms of reflected lights that are correlated with said plurality of second parameter groups, respectively,
wherein said first parameter groups and said second parameter groups include the same angle of the side wall of said concave portion with the bottom surface thereof, and
wherein said referencing the detected waveform of reflected light with the stored waveform selected from said library includes:
acquiring the thickness of said insulating film having said concave portion formed therein, said concave portion being irradiated with light;
selecting an associated library that is associated with the acquired thickness in said plurality of libraries; and
selecting a stored waveform from the selected library to conduct the referencing with the detected waveform of reflected light.

* * * * *